United States Patent [19]

Pasternak et al.

[11] Patent Number: 5,141,649
[45] Date of Patent: Aug. 25, 1992

[54] NOVEL MEMBRANE AND METHOD OF SEPARATION

[75] Inventors: Mordechai Pasternak, Spring Valley; Uygur Kokturk, Poughkeepsie; Mitri S. Najjar, Wappingers Falls; Raymond D. Malouf, Beacon, all of N.Y.

[73] Assignee: Texaco Inc., White Plains, N.Y.

[21] Appl. No.: 772,314

[22] Filed: Oct. 7, 1991

[51] Int. Cl.⁵ .............. B01D 61/36; B01D 69/06; B01D 71/02; B01D 71/38

[52] U.S. Cl. .............. 210/640; 210/321.72; 210/500.25; 210/500.26; 210/500.27; 264/45.1

[58] Field of Search ........ 210/640, 634, 644, 649–654, 210/321.6, 321.72, 321.75, 321.84, 500.25, 500.26, 500.27; 264/41, 45.1

[56] References Cited

U.S. PATENT DOCUMENTS 4,961,855 10/1990 Reale et al. ............. 210/640
4,978,454 12/1990 Sweet ..................... 210/640

Primary Examiner—Frank Sever
Attorney, Agent, or Firm—Robert A. Kulason; James J. O'Loughlin; Carl G. Seutter

[57] ABSTRACT

Charge compositions containing aqueous mixtures of organic oxygenates may be separated by pervaporation through a membrane assembly containing a porous ceramic support bearing as separating layer, a membrane of cured polyvinyl alcohol which has been cross-linked as with glutaraldehyde.

25 Claims, No Drawings

NOVEL MEMBRANE AND METHOD OF SEPARATION

FIELD OF THE INVENTION

This invention relates to the dehydration of organic oxygenates such as alcohols. More particularly it relates to a membrane technique for effecting separation of water from an aqueous composition containing alcohols such as isopropyl alcohol.

BACKGROUND OF THE INVENTION

This invention relates to the dehydration of organic oxygenates such as alcohols. More particularly it relates to a membrane technique for effecting separation of water from an aqueous mixture containing alcohols such as isopropyl alcohol.

As well known to those skilled in the art, it is possible to remove water from mixtures thereof with organic liquids by various techniques including adsorption or distillation. These conventional processes, particularly distillation, are however, characterized by high capital cost. In the case of distillation for example the process requires expensive distillation towers, heaters, heat exchangers (reboilers, condensers, etc.), together with a substantial amount of auxiliary equipment typified by pumps, collection vessels, vacuum generating equipment, etc.

Such operations are characterized by high operating costs principally costs of heating and cooling—plus pumping, etc.

Furthermore the properties of the materials being separated, as is evidenced by the distillation curves, may be such that a large number of plates may be required, etc. When the material forms an azeotrope with water, additional problems may be present which for example, may require that separation be effected in a series of steps (e.g. as in two towers) or by addition of extraneous materials to the system.

There are also comparable problems which are unique to adsorption systems.

It has been found to be possible to utilize membrane systems to separate mixtures of miscible liquids by pervaporation. In this process, the charge liquid is brought into contact with a membrane; and one component of the charge liquid preferentially permeates the membrane. The permeate is then removed as a vapor from the downstream side of the membrane—typically by reducing the pressure below the vapor pressure of the permeating species or by sweeping with a carrier gas.

Illustrative membranes which have been employed in prior art separation techniques include those set forth in the following table:

| | |
|---|---|
| Polyacrylonitrile | Neel, Aptel & Clement Desalination 53, 297, (1985) |
| Crosslinked Polyvinyl Alcohol | Eur. Patent 0 096 339 to GFT as assignee of Bruschke |

The cost effectiveness of a membrane is determined by the selectivity and productivity. Of the membranes commercially available, an illustrative membrane of high performance is that disclosed in European patent 0 096 339 A2 of GFT as assignee of Bruschke - published 21 Dec. 1983.

European Patent 0 096 339 A2 to GFT as assignee of Bruschke discloses, as cross-linking agents, diacids (typified by maleic acid or fumaric acid); dihalogen compounds (typified by dichloroacetone or 1,3-dichloroisopropanol); aldehydes, including dialdehydes, typified by formaldehyde. These membranes are said to be particularly effective for dehydration of aqueous solutions of ethanol or isopropanol.

This reference discloses separation of water from alcohols, ethers, ketones, aldehydes, or acids by use of composite membranes. Specifically the composite includes (i) a backing typically about 120 microns in thickness, on which is positioned (ii) a microporous support layer of a polysulfone or a polyacrylonitrile of about 50 microns thickness, on which is positioned (iii) a separating layer of cross-linked polyvinyl alcohol about 2 microns in thickness.

Polyvinyl alcohol may be cross-linked by use of difunctional agents which react with the hydroxyl group of the polyvinyl alcohol. Typical cross-linking agent may include dialdehydes (which yield acetal linkages), diacids or diacid halides (which yield ester linkages), dihalogen compounds or epichlorhydrin (which yield ether linkages) olefinic aldehydes (which yield ether/acetal linkages), boric acid (which yields boric ester linkages), sulfonamidoaldehydes, etc.

See also J. G. Prichard, *Polyvinyl Alcohol, Basic Properties and Uses*, Gordon and Breach Science Publishers, New York (1970) or C. A. Finch, *Polyvinyl Alcohol, Properties and Applications*, John Wiley and Sons, New York (1973).

Also of interest is U.S. Pat. No. 4,755,299 to GFT Ingenieurebüro für Industrieanlagenbau as assignee of H. Bruschke directed to a separation process using e.g. polysulfone bearing polyvinyl alcohol separating layer which has been cross-linked (e.g. col 2, line 66 to column 3, line 7 inter alia) by esterification with dicarboxylic acids, etherification with acids or dihalogen compounds, or acetalization by means of aldehydes or dialdehydes (note e.g. formaldehyde Ex 3); and European Specification 0 096 339 published 21.12.83 Bulletin 83/51 to the same assignee by the same inventor.

U.S. Pat. No. 4,802,988 which issued Feb. 7, 1989 to Texaco as assignee of John Reale, Jr. and Craig R. Bartels is directed to separation of aqueous organic oxygenates by pervaporation with a membrane of polyvinyl alcohol which has been cross-linked with aliphatic polyaldehydes having $\geq 3$ carbon atoms.

U.S. Pat. No. 4,941,976 which issued Jul. 17, 1991 to Texaco as assignee of Craig R. Bartels and John Reale, Jr. (a divisional of U.S. Pat. No. 4,802,988) is directed to the membrane.

U.S. Pat. No. 5,004,861 which issued Apr. 2, 1991 to Texaco as assignee of Mordechai Pasternak, Craig R. Bartels, and John Reale, Jr. is directed to separation of water from a charge mixture of hydrocarbon/organic oxygenate by pervaporation through a membrane of (i) polyvinyl alcohol which has been cross-linked with aliphatic polyaldehydes having $\geq 3$ carbon atoms.

U.S. Pat. No. 4,961,855 which issued Oct. 9, 1990 to Texaco as assignee of Craig R. Bartels and John Reale, is directed to separation of water/organic oxygenates (such as isopropanol) by pervaporation through a membrane of polyvinyl alcohol which has been cross-linked with aliphatic polyaldehydes having $\geq 3$ carbon atoms.

U.S. Pat. No. 4,935,144 which issued Jun. 19, 1990 to Texaco as assignee of Mordechai Pasternak, Craig R. Bartels, and John Reale, Jr. is directed to separation of ketones from aqueous systems by pervaporation through a membrane of polyvinyl alcohol which has been cross-linked with aliphatic polyaldehydes having ≧3 carbon atoms.

U.S. Pat. No. 4,910,344 which issued May 20, 1990 to Texaco as assignee of Mordechai Pasternak, Craig R. Bartels, and John Reale, Jr. is directed to separation of organic oxygenates from aqueous systems by pervaporation through a membrane of polyvinyl alcohol/polyacrylic acid.

U.S. Pat. No. 4,960,519 which issued Oct. 20, 1990 to Texaco as assignee of Mordechai Pasternak, Craig R. Bartels, John Reale, Jr. and Vatsal M. Shah is directed to separation of alcohol from organic oxygenate by pervaporation through a membrane of polyvinyl alcohol/polyacrylic acid.

U.S. Pat. No. 4,971,699 which issued Nov. 20, 1990 to Texaco as assignee of Craig R. Bartels is directed to separation of water/organic oxygenate by pervaporation through a membrane of polyvinyl alcohol/polyacrylic acid.

It is an object of this invention to provide a novel composite membrane characterized by its ability to effect separation of water from organic oxygenates such as isopropyl alcohol. Other objects will be apparent to those skilled in the art.

STATEMENT OF THE INVENTION

In accordance with certain of its aspect, this invention is directed to a membrane assembly comprising (i) a porous alumina ceramic support; and mounted thereon (ii) a non-porous separating layer of thickness of 1-10 microns of cast polyvinyl alcohol of molecular weight $\overline{M}_n$ of 20,000-200,000 which has been cross-linked (preferably in the presence of acid catalyst) with an aliphatic polyaldehyde preferably containing at least three carbon atoms including those in said aldehyde groups, the mole ratio of aldehyde to vinyl alcohol being 0.05-0.30, and thereafter cured at 100° C.-150° C., said membrane assembly characterized by its ability to separate a charge aqueous composition containing organic oxygenate.

In accordance with certain of its other aspects, this invention is directed to a process for separating a charge aqueous composition containing organic oxygenate which comprises maintaining a porous alumina ceramic support and, mounted thereon, a non-porous membrane separating layer of thickness of 1-10 microns of cast polyvinyl alcohol of molecular weight $\overline{M}_n$ of 20,000-200,000 which has been cross-linked, (preferably in the presence of acid catalyst, with a preferably aliphatic polyaldehyde preferably containing at least three carbon atoms including those in said aldehyde groups, the mole ratio of aldehyde to vinyl alcohol being 0.05-0.30), and thereafter cured at 100° C.-150° C.;

maintaining a pressure drop across said non-porous membrane separating layer, the high pressure side being adjacent to the outer face of said non-porous membrane and the low pressure side being adjacent to the outer face of said porous ceramic support;

passing an aqueous charge composition containing water and organic oxygenate into contact with the high pressure side of said non-porous separating layer whereby at least a portion of said water in said aqueous charge and a lesser portion of organic oxygenate pass by pervaporation through said non-porous separating layer and said porous ceramic support as a lean mixture containing more water and less organic oxygenate than are present in said aqueous charge and said charge is converted to a rich liquid containing less water and more organic oxygenate than are present in said aqueous charge;

recovering from the low pressure side of said porous ceramic support said lean mixture containing more water and less organic oxygenate than are present in said aqueous charge, said lean mixture being recovered in vapor phase at a pressure below the vapor pressure thereof; and recovering from the high pressure side of said non-porous separating layer said rich liquid containing a lower water content and a higher organic oxygenate content than are present in said charge.

DESCRIPTION OF THE INVENTION

The composite membrane assembly of this invention typically includes a multi-layer assembly which in the preferred embodiment preferably includes a porous ceramic support layer which provides inter alia mechanical strength and support to the assembly.

THE POROUS SUPPORT

The porous alumina support layer of this invention includes a porous ceramic support which may be fabricated of ceramic. Typically the ceramic support may be of alumina, silica-alumina, alumina-zirconia, alumina-titania, etc. The preferred ceramic permeable support may be alumina, preferably alpha alumina, in the form of a disk or plate, a cylinder or tube, etc.

The porous ceramic support may be one which is commercially available typified by the Mexbrex brand alpha alumina tube of Alcoa of 10 mm outside diameter, 1.5 mm wall thickness, and 250 mm length.

Another commercially available ceramic support which may be employed may be the Vicor brand of alpha alumina tube having a pore diameter of 40 A.

The preferred porous alumina ceramic support may be characterized by a pore diameter of 25 A-1000 A, say about 100 A; a surface area of 180-390m$^2$/g, say about 285 m$^2$/g, and a porosity of typically 42-58% say 49.5%

In practice of this invention, it is possible to deposit the organic polyvinyl alcohol separating membrane directly on the porous ceramic support. Alternatively in an alternative embodiment, the organic polyvinyl alcohol separating membrane may be deposited on an inorganic gamma alumina membrane which has been deposited on the porous alpha alumina ceramic support.

The inorganic membrane layers of this invention may be formed on the alumina support by use of a charge composition of aluminum alkoxide. Although it may be possible to prepare the novel membranes of this invention from a monoalkoxide Al(OR)X$_2$ (wherein X represents another inert group) or from a di-alkoxide Al(OR)$_2$X, it is preferred to utilize, as charge, a tri-alkoxide characterized by the formula Al(OR)$_3$.

In the above formula, R may be a hydrocarbon group selected from the group consisting of alkyl, aralkyl, cycloalkyl, aryl, and alkaryl including such radicals when inertly substituted. When R is alkyl, it may typically be methyl, ethyl, n-propyl, iso-propyl, n-butyl, i-butyl, secbutyl, amyl, octyl, decyl, octadecyl, etc. When R is aralkyl, it may typically be benzyl, beta-phenylethyl, etc. When R is cycloalkyl, it may typically be cyclohexyl, cycloheptyl, cyclooctyl, 2-methylcycloheptyl, 3-butylcyclohexyl, 3-methylcyclohexyl, etc. When R is aryl, it may typically be phenyl, naphthyl, etc. When R is alkaryl, it may typically be tolyl, xylyl, etc. R may be inertly substituted i.e. it may bear a non-reactive substituent such as alkyl, aryl, cycloalky, ether, etc. Typically inertly substituted R groups may include 2-ethoxyethyl, carboethoxymethyl, 4-methylcyclohexyl, etc. The preferred R groups may be lower alkyl, i.e. $C_1$-$C_{10}$ alkyl, groups including e.g. methyl, ethyl, n-propyl, i-propyl, butyls, amyls, hexyls, octyls, decyls, etc. R may preferably be isopropyl or sec-butyl.

The preferred aluminum alkoxides are those lower aluminum alkoxides (wherein all the R groups are the same). Most preferred are aluminum tri-sec-butoxide and aluminum tri-iso-propoxide. It is preferred to utilize the lower alkoxides because they are generally liquids at temperature of operation and for economic reasons (i.e. they contain a larger relative content of alumina). Aluminum alkoxides are readily available commercially from various suppliers including Aldrich, Fisher, or Johnson Matthey.

In practice of the process of this invention, the charge e.g. $Al(OR)_3$ (referred to as an alkoxide, for convenience) is employed in liquid state. In the case of the higher alkoxides (typified by $Al(OR)_3$ wherein R is octadecyl) which are solid at operating temperature, they may be employed in admixture with an alcohol, preferably ROH i.e. wherein the R group is lower $C_1$-$C_5$ alkyl.

To the charge alkoxide (100 parts) at temperature of 100° C.-250° C., say 125° C., there are added 100-500, preferably 200 parts of liquid alcohol typically a lower $C_1$-$C_5$ alkanol such as isopropanol, and 0.5-7 parts, say 1 part of acid peptizing agent. Typical acid peptizing agents may include nitric acid, oxalic acid, or sulfuric acid. The preferred acid peptizing agent may be nitric acid.

The charge alkoxide liquid, containing peptizing agent, is hydrolyzed by contact with steam at 100° C.-250° C., say 126° C. and 1-150 psig, say 29 psig. During reaction over 0.5-60 minutes, say 20 minutes, the aluminum alkoxide is decomposed by the steam to yield alcohol and alkoxide in which some of the alkoxide groups have been replaced by —OH groups:

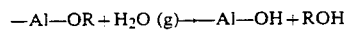

—Al—OR + H₂O (g) ⟶ —Al—OH + ROH

This reaction typically proceeds further to yield hydrolyzed polymer product

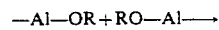

—Al—OR + RO—Al—⟶

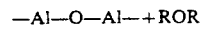

—Al—O—Al— + ROR

The hydrolyzed product of the reaction may be considered a stabilized/peptized colloidal sol of alumina in admixture with the alcohol originally present plus that formed during reaction. The alumina may bear RO— groups on the chain or more likely in terminal position. The alumina in the sol may be characterized by x-ray diffraction and nitrogen porosimetry. The hydrolyzed alumina sol contains gamma alumina with a Pore Mode of typically 25-1000 Å, preferably 100-500 Å, say 200 Å and a BET surface area of typically 180-390 m²/g, typically 220-330 m²/g, say 285 m²/g.

Prior to formation of the alumina membrane on a support, it is desirable to prewet the support as with an alcohol ROH, preferably methanol or ethanol.

Preparation of an alumina membrane assembly from the stabilized sol may be effected by various techniques. If it be desired to coat e.g. the inside of a tubular or cylindrical microporous support, the sol in liquid phase may be steam sprayed through the tubular or cylindrical support to form thereon a membrane of alumina over 1-10, say 1.9 minutes at 50° C.-200° C., say 156° C. In another embodiment, the sol may be steam treated during preparation prior to deposition e.g. on the inside of the tube of alumina.

In still another embodiment, the sol may be deposited on the support and thereon contacted with steam at desired temperature and pressure. In another embodiment, the sol (containing water) may be deposited and steam treatment may be effected by reducing the pressure to generate steam in situ. In another embodiment the stabilized sol liquid may be poured as a thin layer on a flat surface. Excess liquid may be removed by drying at 50° C.-90° C., say 60° C. for 12-36 hours, say 24 hours followed by calcining at 400° C.-600° C., say 400° C. for 24-48 hours, say 34 hours.

Supported alumina membranes may be formed by coating a thin microporous support (formed typically of alpha alumina) with the sol to attain a thin film on the surface thereof. This film-membrane may be dried at 50° C.-90° C., say 60° C. for 12-36 hours, say 24 hours, and then calcined at 400° C.-600° C., say 400° C. for 24-48 hours, say 34 hours.

In any of these embodiments, the sol-generated membrane may be formed on an intermediate layer on the support. For example, it may be desirable to have (i) a microporous support of alpha alumina, bearing (ii) an intermediate inorganic layer of e.g. gamma aluminum oxide (formed thereon e.g. by contact with an aqueous sol of alumina which is dried at 50° C.-90° C., say 60° C. for 12-36 hours, say 2 hours followed by calcining at 250° C.-400° C., say 400° C. for 24-48 hours, say 34 hours) and (iii) an organic separating membrane layer.

When desired, the deposition process may be repeated one or more additional times to obtain inorganic membranes of increasing thickness.

The inorganic membrane layer of this invention so prepared is typically characterized by a thickness of 0.5-25, say 4 microns. When an intermediate layer is present, it may be characterized by a thickness of 10-150, say 25 microns.

The inorganic membranes prepared by the process of this invention are typically characterized (by a high surface area and a narrow Pore Size Distribution) as follows:

TABLE

| Property | Broad | Narrow | Preferred |
|---|---|---|---|
| Surface Area by Multi-point BET m²/g | 180-390 | 220-330 | 285 |
| Pore Volume cc/g for: | | | |
| Pores <1857.2A at P/Po = 0.005 | 3.5-80 | 20-30 | 27 |
| Pore Mode | 25-1000 | 100-500 | 250 |
| Porosity % | 42-58 | 46-52 | 49.5 |

THE SEPARATING LAYER

The organic separating layer which permits attainment of separation in accordance with this invention includes a non-porous film of cross-linked polyvinyl alcohol of thickness of about 1-10 microns preferably 1-5 microns, say 1.5 microns. The layer is formed from polyvinyl alcohol which has been prepared by hydrolysis of polyvinyl acetate-typically 50–100% hydrolyzed, preferably 90–100%, say 100% hydrolyzed. The charge polyvinyl alcohol has a molecular weight of 20,000–200,000, say 88,000. Typically it may be employed as a 5–10 w %, say 7 w % aqueous solution. A commercially available product which may be employed is the Aldrich brand of 100% hydrolyzed polyvinyl alcohol of molecular weight of about 88,000 as 7 w % aqueous solution.

It is a feature of this invention that the membrane or sheet of cross-linked polyvinyl alcohol separating layer is formed in situ on the porous support layer. This is effected by use, as a cross-linking agent, of a preferably an aliphatic dialdehyde preferably containing at least three carbon atoms. More preferably the aliphatic dialdehyde may contain 3–8, commonly 3–6 carbon atoms, most preferably 5 carbon atoms. Typical aliphatic dialdehydes which may be employed may include:

TABLE

Glutaraldehyde
2-hydroxyhexanedial-1,6
malonic dialdehyde
succinic dialdehyde
hexanedial-1,6

The preferred aliphatic dialdehyde is glutaraldehyde. Aldehydes falling outside the scope of this invention typified by formaldehyde, glyoxal, or succinic semi aldehyde yield membranes which are characterized by less satisfactory performance. Performance is judged by the ability of a membrane system to give a permeate containing less than 15 w % isopropanol (from a charge containing 85 w % isopropanol and 15 w % water) with a flux of at least 1.5 kilograms/meter $^2$/hour(kmh) at a feed temperature of 70° C. and with a permeate pressure of 5 mmHg and a condenser cooled by liquid nitrogen). Compositions falling outside the scope of this invention may be characterized by unsatisfactory selectivity or unsatisfactory productivity or both.

In situ cross-linking may be carried out by casting 5–10 w %, say 7 w % aqueous solution of polyvinyl alcohol which contains the aliphatic dialdehyde cross-linking agent. The mole ratio of cross-linking agent to polyvinyl alcohol may be 0.05–0.30, say 0.2.

Cross-linking is carried out, in the presence of acid catalyst, preferably inorganic acid. Sulfuric acid is preferred. The mole ratio of acid to aldehyde may be 0.1–0.3, say 0.2.

The composite membrane may then be cured in an oven at 100° C.–150° C., say 125° C. for 1–30 minutes, say 15 minutes to yield a polyvinyl alcohol film having a thickness of 1–10 microns, say 1.5 microns.

It will be found that, when viewed in cross-section, the typical composite membrane assembly includes a support layer of porous ceramic support bearing thereon a 1.5 micron layer of polyvinyl alcohol ($\overline{M}_n$ of 88,000) which has been cross-linked with glutaraldehyde in the presence of sulfuric acid and then cured at 125° C. It appears that the separating layer of polyvinyl alcohol penetrates into the pores of the porous ceramic support; and this undoubtedly contributes to the bonding between the layer and the support.

In one preferred embodiment, the structure may include a conduit or tube of porous ceramic, preferably alpha alumina. Preparation of the assembly of this invention may include coating the outside (or more preferably the inside) of this tube with the e.g. 5–10 w % aqueous solution containing the polyvinyl alcohol ($\overline{M}_n$ of 20,000–200,000) preferably containing e.g. glutaraldehyde in mole ratio of cross-linking agent to polyvinyl alcohol of 0.05–0.3, say 0.2 and sulfuric acid in mole ratio of acid to aldehyde of 0.1–0.3, say 0.2 at ambient temperature of 20° C.–30° C., say 25° C. The solution may remain in contact with the alumina for 10–20 minutes, say 15 minutes and then is poured off.

Preferably a solution of polyvinyl alcohol and e.g. glutaraldhyde is pumped through the tube for 10–20, say 15 minutes; and thereafter the tube is filled with acid for 10–20 say 15 minutes. Curing is effected at 100°–150° C. to yield a film of 1–10, say about 1.5 microns thickness.

In another embodiment, a porous layer of gamma alumina, of pore size of 10–150 A, say 25 A may be deposited on the ceramic support (and cured at 700° F.–1200° F., say 800° F. for 1–24 hours, say 18 hours) prior to deposition thereon of the polyvinyl alcohol separating layer.

The tube so prepared, together with a plurality of other tubes so prepared, is fitted within a shell (in manner comparable to a shell-and-tube heat exchanger) provided with an inlet at one end and an outlet at the other. A baffle-like seal between the inner surface of the shell and the outer surface prevents fluid from bypassing the operative membrane system and insures that fluid enters the system principally at one end. The charge passes from the feed channel, into contact with the separating layer and thence therethrough, and is withdrawn as permeate.

In operation, the charge liquid is admitted to the tube side and passes through the inside of the tubes and exits as retentate. During passage through the tubes, permeate passes through the non-porous separating layer and permeate is collected in the shell side.

Alternatively a honeycomb configuration may be employed.

PERVAPORATION

It is a feature of the non-porous polyvinyl alcohol separating layer that it is found to be particularly effective when used in a pervaporation process. In pervaporation, a charge liquid containing a more permeable and a less permeable component is maintained in contact with a non-porous separating layer; and a pressure drop is maintained across that layer. The charge liquid dissolves into the membrane and diffuses therethrough. The permeate which passes through the membrane and exits as a vapor may be recovered by condensing at low temperature or alternatively may be swept away by use of a moving stream of gas. Preferably, the permeate side of the membrane is maintained at a low pressure, typically 5 mm.Hg.

For general background on pervaporation, note U.S. Pat. Nos. 4,277,344; 4,039,440; 3,926,798; 3,950,247; 4,035,291; etc.

It is a feature of this invention that the novel membrane may be particularly useful in pervaporation processes for dewatering aqueous solutions of alcohols such as ethanol, isopropanol, etc. or of aqueous solutions of glycols containing at least two hydroxy groups on a carbon backbone, typified by glycols se such as ethylene glycol, propylene glycol, butylene glycols, etc. triols including glycerine, etc; glycol ethers including diethylene glycol, triethylene glycol, etc.

A typical charge may contain 50-99 w %, say 85 w % aqueous solution of isopropanol or of ethylene glycol.

In practice of the pervaporation process of this invention, the charge aqueous solution at 40° C.-120° C., say 70° C. may be passed into contact with the non-porous separating layer of the membrane of this invention. A pressure drop of about one atmosphere is commonly maintained across the membrane. Typically, the feed or charge side of the membrane is at about atmospheric pressure and the permeate or discharge side of the membrane is at a pressure of about 2-50 preferably 2-20, say 5 mm.Hg.

The permeate which passes through the membrane and the supporting structure includes water and a small proportion of the isopropanol or glycol from the charge liquid. Typically, the permeate contains 88-98, say 97 w % water. Permeate is recovered in vapor phase.

Pervaporation may typically be carried out at a flux of 0.1-5, say 2 kilograms per square meter per hour (kmh). Typically, the units may have a selectivity (measured in terms of w % water in the permeate during pervaporation at 70° C. of an 85% aqueous solution of isopropanol through a standard polyvinyl alcohol separating layer of 2 microns thickness) of 97 w % water.

Practice of the process of this invention will be apparent to those skilled in the art from inspection of the following examples wherein, as elsewhere in this specification, all parts are parts by weight unless otherwise stated.

DESCRIPTION OF SPECIFIC EMBODIMENTS

Example I

In this example which represents the best mode presently known of carrying out the process of this invention, the porous ceramic support is a tube (10 mm outside diameter, 1.5 mm wall thickness, and 250 mm length) of the Alcoa Membralox brand alpha alumina tube containing particles of diameter of about 200-600 A, say 400 A and pores of diameter of about 100 A.

The separating layer is formed from a coating solution containing 20 g of 7 w % polyvinyl alcohol ($\overline{M}_n$ of 88,000) in water to which is added 25 w % of glutaraldehyde in mole ratio of glutaraldehyde to polyvinyl alcohol of about 0.2. This solution is continuously pumped through the tube for 15 minutes. There is then pumped through the tube 0.05N aqueous sulfuric acid in mole ratio of acid to glutaraldehyde of 0.2. After 15 minutes, the membrane is cured at 125° C. for 30 minutes.

To this membrane assembly, there is charged aqueous solution containing 85 w % isopropanol. Pervaporation at charge pressure of atmospheric pressure and permeate pressure at 5 mmHg is carried out over 22 days at 70° C. The permeate contains 97.3 w % water and the Flux is 3.37 kmh.

Example II

In this Example, the procedure of Example I is followed except that the coating solution is admitted into the tube and allowed to stand for 15 minutes. It is then poured off and the acid/glutaraldehyde mixture is admitted and allowed to stand for 15 minutes. This membrane is then cured at 125° C. for 30 minutes.

The Selectivity is found to be 91 w % (water in the permeate) and the Flux is 2.87 kmh.

Example III*

In this control Example III*, the procedure for preparing the membrane is that set forth in Example 1 of U.S. Pat. No. 4,961,855. The membrane includes a polyester carrier layer, a polysulfone (PS) support layer, and a polyvinyl alcohol separating layer.

The Selectivity is 99 w % and the Flux is 1.0 kmh.

Example IV*

In this Control Example IV*, the procedure for preparing the membrane is that set forth in Example 1 of European specification 0 096 339 of GFT. The membrane includes a polyester carrier layer, a polyacrylonitrile (PAN) support layer, and a polyvinyl alcohol separating layer.

The Selectivity is 97.2 w % and the Flux is 0.28 kmh.

TABLE

| Example | Membrane | Selectivity (% Water Permeate) | Flux kmh |
|---|---|---|---|
| I | PVA/Al$_2$O$_3$ | 97.3 | 3.37 |
| II | PVA/Al$_2$O$_3$ | 91 | 2.87 |
| III* | PVA/PS | 99 | 1.0 |
| IV* | PVA/PAN | 97.2 | 0.28 |

From the above Table, it is apparent that practice of the process of this invention permits attainment of desirably high Selectivity at highest Flux. In particular, the Flux is 3-12 times that of the Control Examples.

Examples V-IX

In this series of Examples, the procedure of Example I is duplicated except that the concentration of isopropanol (IPA) in the isopropanol/water charge is varied.

TABLE

| Example | Feed (w % Water) | Selectivity (% Water in Permeate) | Flux (kmh) |
|---|---|---|---|
| V | 11 | 82.6 | 1.62 |
| VI | 14 | 89.9 | 2.95 |
| VII | 16 | 91 | 2.87 |
| VIII | 17 | 89.9 | 3.14 |
| IX | 21 | 88.2 | 3.78 |

From the Table it is apparent that satisfactory Selectivity at high Flux may be attained.

Results comparable to those of Example I may be attained if the porous ceramic support is:

TABLE

| Example | Porous Ceramic Support |
|---|---|
| X | Zirconia-Alumina |
| XI | Silica-Alumina |

Results comparable to those attained in Example I maybe attained if the charge aqueous liquid is:

TABLE

| Example | Charge |
|---|---|
| XII | 85 w % ethylene glycol |
| | 15 w % water |
| XIII | 95 w % acetone |
| | 5 w % water |
| XIV | 98 w % methyl ethyl ketone |
| | 2 w % water |

Although this invention has been illustrated by reference to specific embodiments, it will be apparent to those skilled in the art that various charges and modifications may be made which clearly fall within the scope of the invention.

What is claimed:

1. A membrane assembly comprising
   (i) a porous alumina ceramic support; and mounted thereon
   (ii) a non-porous separating layer of thickness of 1-10 microns of cast polyvinyl alcohol of molecular weight $\overline{M}_n$ of 20,000-200,000 which has been cross-linked;
   said membrane assembly characterized by its ability to separate a charge aqueous composition containing organic oxygenate.

2. A membrane assembly as claimed in claim 1 wherein said cross-linking is effected with a polyaldehyde.

3. A membrane as claimed in claim 1 wherein said aliphatic polyaldehyde is a $C_3-C_8$ aliphatic dialdehyde.

4. A membrane assembly as Claimed in claim 1 wherein said porous ceramic support comprises alpha alumina.

5. A membrane assembly as Claimed in claim 1 wherein said porous ceramic support comprises alpha alumina containing pores of diameter of 25 A-1000 A.

6. A membrane assembly comprising
   (i) a porous alumina ceramic support; and mounted thereon
   (ii) a non-porous separating layer of thickness of 1-10 microns o polyvinyl alcohol of molecular weight $\overline{M}_n$ of 20,000-200,000 which has been cross-linked, in the presence of acid catalyst, with an aliphatic polyaldehyde containing at least three carbon atoms including those in said aldehyde groups, the mole ratio of aldehyde to vinyl alcohol being 0.05-0.30, and thereafter cured at 100° C.-150° C.;
   said membrane assembly characterized by its ability to separate a charge aqueous composition containing organic oxygenate.

7. A membrane assembly comprising
   (i) a porous alpha alumina ceramic support; and mounted thereon
   (ii) a porous gamma alumina layer; and mounted thereon
   (iii) a non-porous separating layer of thickness of 1-10 microns of cast polyvinyl alcohol of molecular weight $\overline{M}_n$ of 20,000-200,000 which has been cross-linked, in the presence of acid catalyst, with an aliphatic polyaldehyde containing at least three carbon atoms including those in said aldehyde groups, the mole ratio of aldehyde to vinyl alcohol being 0.05-0.30, and thereafter cured at 100° C.-150° C.
   said membrane assembly characterized by its ability to separate a charge aqueous composition containing organic oxygenate.

8. The method of forming a membrane assembly which comprises
   maintaining, as a porous alumina support layer, a porous alumina ceramic support bearing a surface containing a surface layer of pores;
   depositing on said surface and in said surface layer of pores, polyvinyl alcohol of $\overline{M}_n$ of 20,000-200,000 thereby forming a surface layer of polyvinyl alcohol interlocked in said surface layer of pores of said porous ceramic support;
   cross-linking said surface layer of polyvinyl alcohol, interlocked in said surface layer of pores of said porous alumina ceramic support, thereby forming a cross-linked non-porous layer on said porous alumina ceramic support; and
   curing said cross-linked non-porous layer.

9. The method of forming a membrane assembly as claimed in claim 8 wherein said porous ceramic support is formed of alpha alumina.

10. The method of forming a membrane assembly as claimed in claim 8 wherein said porous ceramic support is formed of alumina and is characterized by a pore diameter of 25 A-1000 A.

11. The method of forming a membrane assembly as claimed in claim 8 wherein said surface layer of polyvinyl alcohol, prior to casting, has a molecular weight $\overline{M}_n$ of about 20,000-200,000.

12. The method of forming a membrane assembly as claimed in claim 8 wherein said surface layer of polyvinyl alcohol has a thickness of about 1-10 microns.

13. The method of forming a membrane assembly as claimed in claim 8 wherein cross-linking agent is an aliphatic polyaldehyde.

14. The method of forming a membrane assembly as claimed in claim 8 wherein said cross-linking is effected by an aliphatic dialdehyde in the presence of acid cross-linking catalyst.

15. The method of forming a membrane assembly as claimed in claim 8 wherein said curing is effected at about 100° C.-150° C.

16. The process for separating a charge aqueous composition containing organic oxygenate which comprises
   maintaining a porous alumina ceramic support and, mounted thereon, a non-porous membrane separating layer of thickness of 1-10 microns of cast polyvinyl alcohol of molecular weight $\overline{M}_n$ of 20,000-200,000 which has been cross-linked, and thereafter cured
   maintaining a pressure drop across said non-porous membrane separating layer, the high pressure side being adjacent to the outer face of said non-porous membrane and the low pressure side being adjacent to the outer face of said porous alumina ceramic support;
   passing an aqueous charge composition containing water and organic oxygenate into contact with the high pressure side of said non-porous separating layer whereby at least a portion of said water in said aqueous charge and a lesser portion of organic oxygenate pass by pervaporation through said non-porous separating layer and said porous ceramic support as a lean mixture containing more water and less organic oxygenate than are present in said aqueous charge and said charge is converted to a rich liquid containing less water and more organic oxygenate than are present in said aqueous charge;
   recovering from the low pressure side of said non-porous separating layer said lean mixture containing more water and less organic oxygenate than are present in said aqueous charge, said lean mixture being recovered in vapor phase at a pressure below the vapor pressure thereof; and
   recovering from the high pressure side of said porous ceramic support said rich liquid containing a lower water content and a higher organic oxygenate content than are present in said charge.

17. The process claimed in claim 16 wherein said organic oxygenate is an alcohol.

18. The process claimed in claim 16 wherein said organic oxygenate is isopropyl alcohol.

19. The process claimed in claim 16 wherein said organic oxygenate is a ketone.

20. The process claimed in claim 16 wherein said organic oxygenate is methyl ethyl ketone.

21. The process claimed in claim 16 wherein said organic oxygenate is methyl isobutyl ketone.

22. The process claimed in claim 16 wherein said organic oxygenate is acetone.

23. The process claimed in claim 16 wherein said non-porous layer is prepared by casting polyvinyl alcohol from aqueous medium as a membrane and curing said film at 100° C.–150° C. for 1–30 minutes.

24. The process claimed in claim 16 wherein cross-linking is effected by an aliphatic polyaldehyde containing at least three carbon atoms including those in said aldehyde groups.

25. The process for separating a charge aqueous composition containing isopropanol which comprises
maintaining a porous alumina ceramic support and, mounted thereon, a non-porous membrane separating layer of thickness of 1–10 microns of cast polyvinyl alcohol of molecular weight $\overline{M}_n$ of 20,000–200,000 which has been cross-linked, and thereafter cured
maintaining a pressure drop across said non-porous membrane separating layer, the high pressure side being adjacent to the outer face of said non-porous membrane and the low pressure side being adjacent to the outer face of said porous alumina ceramic support;
passing an aqueous charge composition containing water and isopropanol into contact with the high pressure side of said non-porous separating layer whereby at least a portion of said water in said aqueous charge and a lesser portion of isopropanol pass by pervaporation through said non-porous separating layer and said porous ceramic support as a lean mixture containing more water and less isopropanol than are present in said aqueous charge and said charge is converted to a rich liquid containing less water and more isopropanol than are present in said aqueous charge;
recovering from the low pressure side of said non-porous separating layer said lean mixture containing more water and less isopropanol than are present in said aqueous charge, said lean mixture being recovered in vapor phase at a pressure below the vapor pressure thereof; and
recovering from the high pressure side of said porous ceramic support said rich liquid containing a lower water content and a higher isopropanol content than are present in said charge.

* * * * *